United States Patent
Shin et al.

(10) Patent No.: US 8,339,533 B2
(45) Date of Patent: Dec. 25, 2012

(54) VERTICAL ALIGNMENT MODE LIQUID CRYSTAL DISPLAY AND METHOD OF MANUFACTURING THE SAME

(75) Inventors: Jae-Yong Shin, Suwon-si (KR); Woo-Sung Sohn, Seoul (KR); Doo-Hwan You, Gwangmyeong-si (KR); Young-Hoon Yoo, Asan-si (KR)

(73) Assignee: Samsung Display Co., Ltd. (KR)

( * ) Notice: Subject to any disclaimer, the term of this patent is extended or adjusted under 35 U.S.C. 154(b) by 420 days.

(21) Appl. No.: 12/731,543

(22) Filed: Mar. 25, 2010

(65) Prior Publication Data
US 2011/0164198 A1    Jul. 7, 2011

(30) Foreign Application Priority Data
Jan. 6, 2010   (KR) .................. 10-2010-0000948

(51) Int. Cl.
*G02F 1/1368* (2006.01)
*H01L 33/00* (2010.01)
*G02F 1/343* (2006.01)

(52) U.S. Cl. .................. 349/46; 257/E33.053

(58) Field of Classification Search ............. 349/46, 349/117–120, 153–155, 139; 438/23; 257/E33.053
See application file for complete search history.

(56) References Cited

U.S. PATENT DOCUMENTS

| 6,191,837 | B1 | 2/2001 | Fujimaki et al. |
| 6,556,263 | B2 | 4/2003 | Gu |
| 2005/0185105 | A1* | 8/2005 | Miyachi et al. ............. 349/141 |

* cited by examiner

*Primary Examiner* — Akm Ullah
(74) *Attorney, Agent, or Firm* — Cantor Colburn LLP

(57) ABSTRACT

A vertical alignment liquid crystal display includes a first substrate and a second substrate disposed opposite the first substrate. The first substrate includes a first insulation substrate, as well as a first pixel electrode and a second pixel electrode disposed in a same layer with the first pixel electrode on the first insulation substrate. The second substrate includes a second insulation substrate, a first patterned conductive layer disposed on only a portion of the second insulation substrate which is above the first pixel electrode, and a second patterned conductive layer disposed on only a portion of the second insulation substrate which is above the second pixel electrode.

21 Claims, 12 Drawing Sheets

VERTICAL ALIGNMENT MODE LIQUID CRYSTAL DISPLAY AND METHOD OF MANUFACTURING THE SAME

This application claims priority to Korean Patent Application No. 10-2010-0000948, filed on Jan. 6, 2010, and all the benefits accruing therefrom under 35 U.S.C. §119, the content of which in its entirety is herein incorporated by reference.

BACKGROUND OF THE INVENTION (1) Field of the Invention

The present invention relates to a liquid crystal display and a method of manufacturing the same. More particularly, the present invention relates to a vertical alignment mode liquid crystal display and a method of manufacturing the vertical alignment mode liquid crystal display.

(2) Description of the Related Art

A liquid crystal display ("LCD") typically includes an LCD substrate, which includes a thin film transistor ("TFT") substrate and a cover substrate with a liquid crystal layer the interposed therebetween. The LCD displays an image by controlling a transmittance of light that passes through the liquid crystal layer. More specifically, the transmittance changes according to an alignment of liquid crystal molecules in the liquid crystal layer, which are aligned by an electric field that is generated by applying a voltage to electrodes on the TFT substrate and/or the cover substrate.

LCDs have various display modes, which are generally determined by an alignment mode of the liquid crystal molecules. For example, in a vertical alignment ("VA") mode LCD, the liquid crystal molecules are initially aligned vertically with respect to the TFT substrate, but are aligned obliquely or horizontally to the TFT substrate when a voltage is applied to the electrodes. Specific examples of the VA mode LCD include a patterned vertical alignment ("PVA") mode LCD and an electrically controlled birefringence ("ECB") LCD. Although the TN, PVA and ECB mode LCDs are easy to manufacture (relative to other types of LCDs), they all have disadvantages that include, for example, a narrow viewing angle due to a vertical alignment of the liquid crystal molecules when the voltage is applied to the electrodes.

In attempts to solve the narrow viewing angle problem, additional modes have been researched, such as an in plane switching ("IPS") mode and a plane to line switching ("PLS") mode, for example. In the IPS mode, liquid crystal molecules are aligned along a plane by disposing two or more electrodes parallel to each other and in different layers on a substrate and inducing a horizontal electric field between the electrodes, substantially parallel to the substrate. Thus, the IPS mode LCD is a horizontal alignment ("HA") LCD. In the PLS mode, a common electrode and pixel electrodes are disposed on a lower substrate, an insulating layer is interposed therebetween, and liquid crystal molecules move to fill a gap between an upper substrate and the lower substrate in each pixel area by forming a fringe electric field in the pixel area. Thus, in the PLS mode LCD, both vertical and horizontal electric fields are formed, as the PLS mode has a structure that forms the vertical and horizontal electric fields using the common electrode and the pixel electrodes. Since the PLS mode LCD has both vertical and horizontal electric fields, an aperture ratio and transmittance are improved.

In both the IPS and PLS modes, the electrodes are disposed on the lower substrate (which is typically the thin film transistor substrate). Therefore, a cover substrate, e.g., the upper substrate, of the IPS and PLS mode LCDs does not include electrodes. Thus, the IPS mode LCD and the PLS mode LCD both have a problem of easy generation of static electricity during a manufacturing process thereof. Moreover, an electrostatic chuck ("ESC") cannot be used in manufacturing the IPS or PLS mode LCDs, since the cover substrate does not include an electrode, which would normally be used to generate electrostatic forces with the ESC during the manufacturing process.

In attempts to overcome the abovementioned deficiencies, it has been suggested that an electrode layer be disposed on a rear portion of the cover substrate. However, this results in defects being generated in the LCD, due to scratches made by conveyor rollers, stains and chemicals, for example.

BRIEF SUMMARY OF THE INVENTION

Exemplary embodiments of the present invention provide a high transmittance-vertical alignment ("HT-VA") mode liquid crystal display ("LCD"), which provides improvements that include, but are not limited to, substantially improved transmittance and a reduction of static electricity and other defects or deficiencies associated with a manufacturing process of the HT-VA LCD.

Exemplary embodiments of the present invention also provide a method of manufacturing the HT-VA LCD.

According to an exemplary embodiment, a vertical alignment liquid crystal display ("VA LCD") includes a first substrate, a second substrate disposed opposite the first substrate and a liquid crystal layer disposed between the first substrate and the second substrate. The first substrate includes a first insulation substrate, a gate insulating layer disposed on the first insulating substrate, a first semiconductor disposed on the gate insulating layer, a first data line disposed on the first semiconductor, a second semiconductor disposed on the gate insulating layer, a second data line disposed on the second semiconductor, a passivation layer disposed on the first data line and the second data line, a first pixel electrode disposed on the passivation layer, a second pixel electrode disposed on the passivation layer, and a first alignment layer disposed on the first pixel electrode and the second pixel electrode. The second substrate includes a second insulation substrate, a first patterned conductive layer disposed on only a portion of the second insulation substrate that is above the first pixel electrode and the first data line, a second patterned conductive layer disposed on only a portion of the second insulation substrate that is above the second pixel electrode and the second data line, and a second alignment layer disposed on the first patterned conductive layer and the second patterned conductive layer. The liquid crystal layer includes vertically aligned ("VA") liquid crystal molecules. The first pixel electrode and the second pixel electrode are disposed in a same layer on the first insulation substrate. The first pixel electrode and the second pixel electrode each include a projection portion, a longitudinal stem portion, a transverse stem portion, and branch portions extending from the longitudinal stem and the transverse stem. The transverse stems form about a 45 degree angle with both the longitudinal stem and the transverse stem.

The VA LCD may further include a first storage electrode disposed on the first insulation substrate under the gate insulation layer, and a second storage electrode disposed on the first insulation substrate under the gate insulation layer.

The first pixel electrode may be disposed on the passivation layer above a portion of the first storage electrode, and the second pixel electrode may be disposed on the passivation layer above a portion of the second storage electrode.

The VA LCD may further include a first ohmic contact disposed on the first semiconductor and a second ohmic contact disposed on the second semiconductor. The first storage electrode is disposed on the first ohmic contact, and the second storage electrode is disposed on the second ohmic contact.

The VA LCD may further include a storage extension part connected to the first storage electrode and the second storage electrode and disposed on the first substrate under the projection portions of the first pixel electrode and the second pixel electrode.

The VA LCD may further include a first drain electrode extension disposed on the gate insulating layer between the projection portion of the first pixel electrode and the storage extension part, and a second drain electrode extension disposed on the gate insulating layer between the projection portion of the second pixel electrode and the storage extension part. An area of each of the first drain electrode extension and the second drain electrode extension may be greater than an area of each of a first drain electrode and a second drain electrode, respectively.

The VA LCD may further include a first light blocking member disposed on the first patterned conductive layer, and a second light blocking member disposed on the second patterned conductive layer.

The first light blocking member may overlap the first data line and a portion of the first pixel electrode, and the second light blocking member may overlap the second data line and a portion of the second pixel electrode.

The first light blocking member and/or the second light blocking member may be a dual-layer structure.

The VA LCD may further include a first color filter disposed on a first portion of the first light blocking member, and a second color filter disposed on a second portion of the first light blocking member and a first portion of the second light blocking member.

The VA LCD may further include an overcoat disposed on the first color filter and the second color filter.

The branch portions of the first pixel electrode may be interdigitated with the branch portions of the second pixel electrode.

Upper branch portions of the branch portions of both the first pixel electrode and the second pixel electrode may be parallel to each other, while lower branch portions of the branch portions of both the first pixel electrode and the second pixel electrode may be parallel to each other, and the upper branch portions form about a 90 degree angle with the lower branch portions.

The first patterned conductive layer and/or the second patterned conductive layer may be electrically floated.

In another exemplary embodiment, a method of manufacturing a VA LCD includes: forming a first substrate; forming a second substrate opposite to the first substrate; interposing a liquid crystal layer between the first substrate and the second substrate; forming a first insulation substrate on the first substrate; forming a gate insulating layer on the first insulating substrate; forming a first semiconductor and a second semiconductor on the gate insulating layer; forming a first data line on the first semiconductor; forming a second data line on the second semiconductor; forming a passivation layer on the first data line and the second data line; forming a first pixel electrode and a second pixel electrode on the passivation layer; forming a first alignment layer on the first pixel electrode and the second pixel electrode; forming a second insulation substrate on the second substrate; forming a first patterned conductive layer on only a portion of the second insulation substrate which is above the first pixel electrode and the first data line; forming a second patterned conductive layer on only a portion of the second insulation substrate which is above the second pixel electrode and the second data line; forming a second alignment layer on the first patterned conductive layer and the second patterned conductive layer. The liquid crystal layer includes VA liquid crystal molecules, the first pixel electrode and the second pixel electrode are disposed in a same layer on the first insulation substrate, and the first pixel electrode and the second pixel electrode each include a projection portion, a longitudinal stem portion, a transverse stem portion, and branch portions extending from the longitudinal stem and the transverse stem. The branch portions form about a 45 degree angle with both the longitudinal stem and the transverse stem, and the branch portions of the first pixel electrode are interdigitated with the branch portions of the second pixel electrode.

The method may further include: forming a first storage electrode on the first insulation substrate under the gate insulation layer; forming a second storage electrode on the first insulation substrate under the gate insulation layer; forming a first ohmic contact on the first semiconductor; and forming a second ohmic contact on the second semiconductor. The first storage electrode may be disposed on the first ohmic contact, and the second storage electrode may be disposed on the second ohmic contact. The first pixel electrode may be disposed on the passivation layer above a portion of the first storage electrode, and the second pixel electrode may be disposed on the passivation layer may be above a portion of the second storage electrode.

The method may further include: forming a storage extension part connected to the first storage electrode and the second storage electrode and disposed on the first substrate under the projection portions of the first pixel electrode and the second pixel electrode; forming a first drain electrode extension on the gate insulating layer between the projection portion of the first pixel electrode and the storage extension part; and forming a second drain electrode extension on the gate insulating layer between the projection portion of the second pixel electrode and the storage extension part. An area of each of the first drain electrode extension and the second drain electrode extension may be greater than an area of each of a first drain electrode and a second drain electrode, respectively.

The method may further include: forming a first light blocking member on the first patterned conductive layer; and forming a second light blocking member on the second patterned conductive layer. The first light blocking member may overlap the first data line and a portion of the first pixel electrode, the second light blocking member may overlap the second data line and a portion of the second pixel electrode, and the first light blocking member and/or the second light blocking member may include a dual-layer structure.

The method may further include: forming a first color filter on a first portion of the first light blocking member; forming a second color filter on a second portion of the first light blocking member and a first portion of the second light blocking member; and forming an overcoat on the first color filter and the second color filter.

Upper branch portions of the branch portions of both the first pixel electrode and the second pixel electrode may be parallel to each other, lower branch portions of the branch portions of both the first pixel electrode and the second pixel electrode may be parallel to each other, and the upper branch portions form about a 90 degree angle with the lower branch portions.

The first patterned conductive layer and/or the second patterned conductive layer may be electrically floated.

According to yet another exemplary embodiment, a VA LCD includes a first substrate and a second substrate disposed opposite the first substrate. The first substrate includes a first insulation substrate, as well as a first pixel electrode and a second pixel electrode disposed in a same layer with the first pixel electrode on the first insulation substrate. The second substrate includes a second insulation substrate, a first patterned conductive layer disposed on only a portion of the second insulation substrate which is above the first pixel electrode, and a second patterned conductive layer disposed on only a portion of the second insulation substrate which is above the second pixel electrode.

BRIEF DESCRIPTION OF THE DRAWINGS

The above and other aspects and features of the present invention will become more readily apparent by describing in further detail exemplary embodiments thereof with reference to the accompanying drawings, in which.

DETAILED DESCRIPTION OF THE INVENTION

Figure 1:
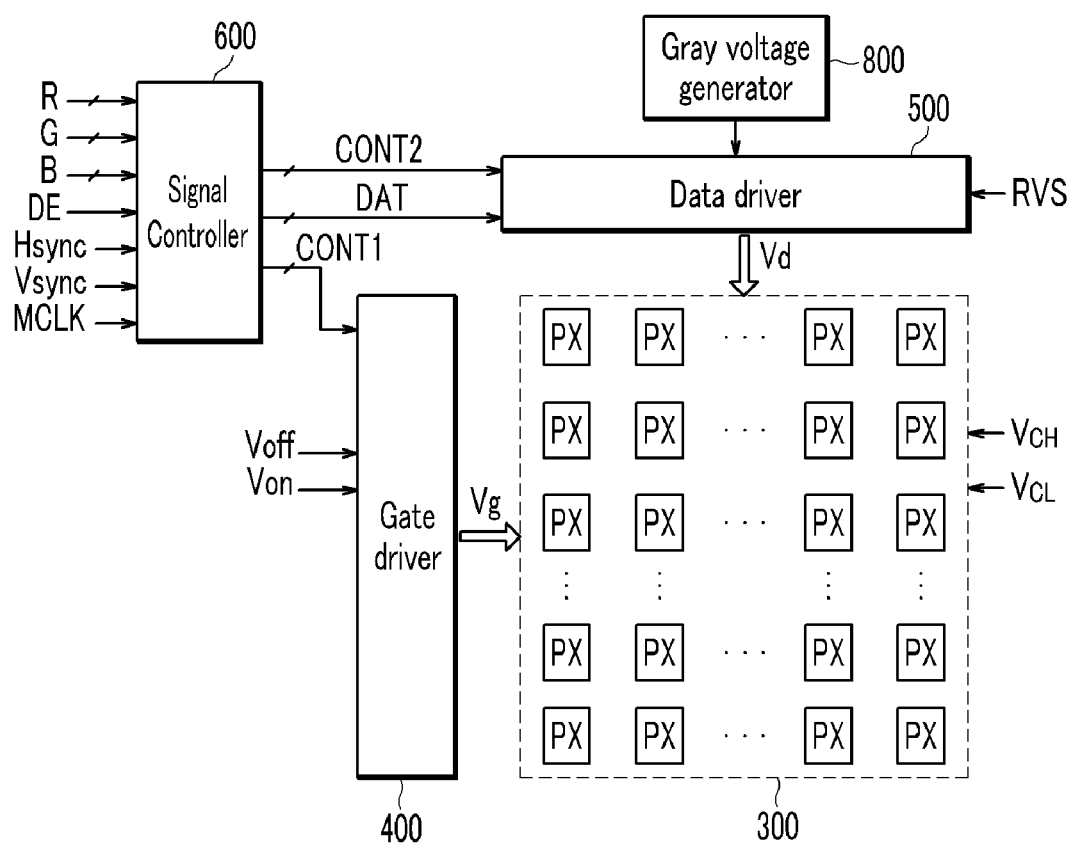
FIG. 1 is a block diagram of an exemplary embodiment of a liquid crystal display according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

Figure 2:
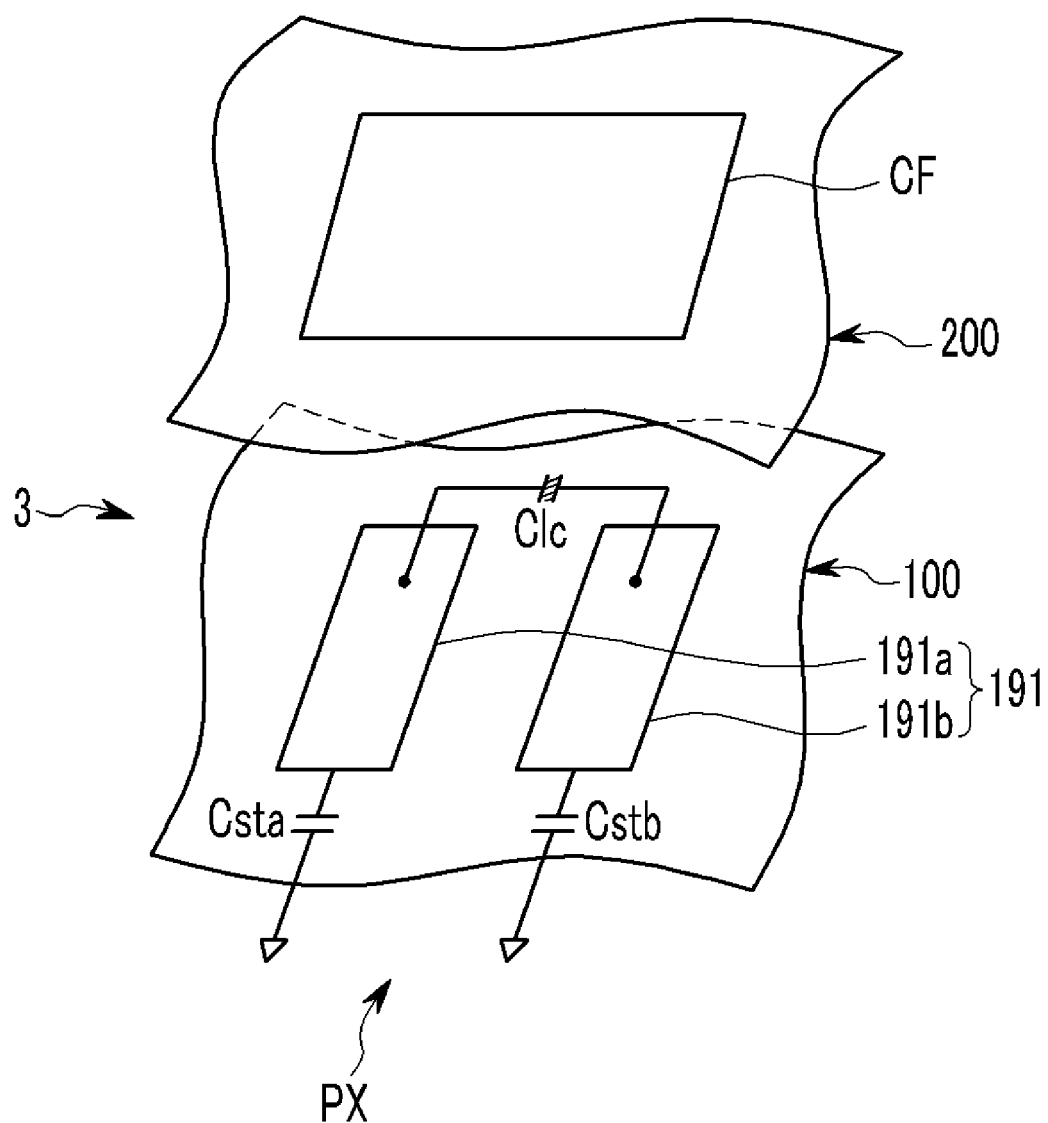
FIG. 2 is an equivalent circuit diagram of an exemplary embodiment of one pixel of a liquid crystal display according to the present invention.
Figure 3:
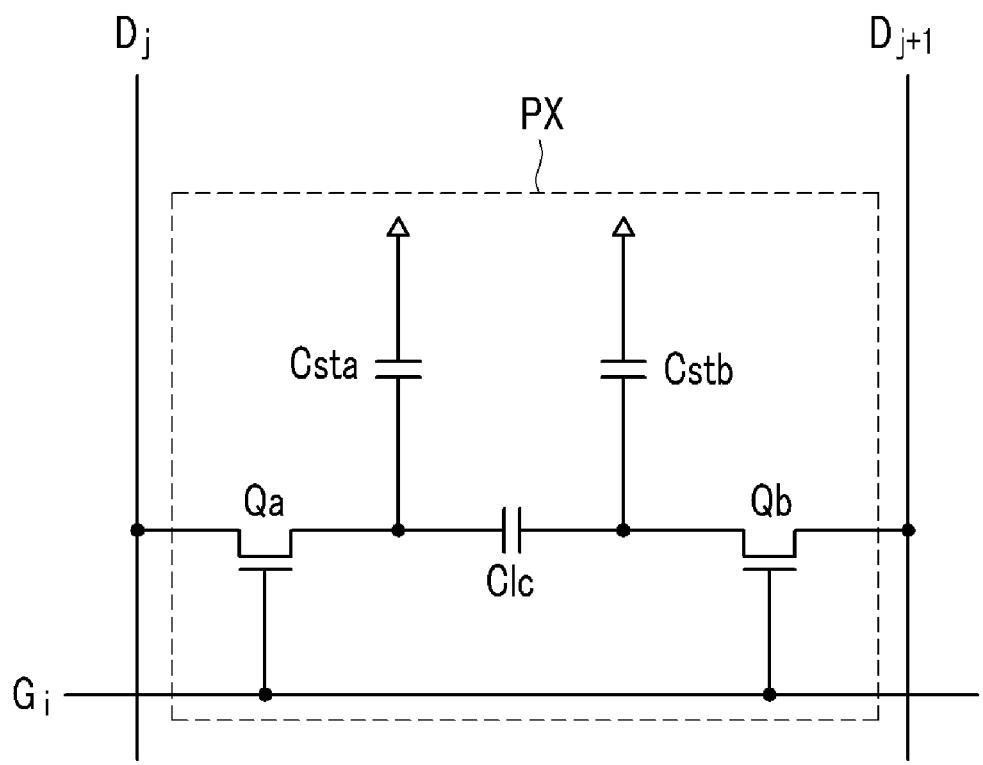
FIG. 3 is a schematic circuit diagram of an exemplary embodiment of one pixel of a liquid crystal display according to the present invention.

FIG. 1 is a block diagram of an exemplary embodiment of a liquid crystal display ("LCD") according to the present invention, FIG. 2 is an equivalent circuit diagram of an exemplary embodiment of one pixel of a liquid crystal display according to the present invention, and FIG. 3 is a schematic circuit diagram of an exemplary embodiment of one pixel of a liquid crystal display according to the present invention.

Referring to FIG. 1, a high transmittance-vertical alignment ("HT-VA") LCD according to an exemplary embodiment of the present invention includes a liquid crystal substrate assembly 300, a gate driver 400 that provides a gate signal Vg to the liquid crystal substrate assembly 300, a data driver 500 that provides a data voltage Vd to the liquid crystal substrate assembly 300, a gray voltage generator 800 and a signal controller 600.

Referring to FIGS. 1 through 3, the liquid crystal substrate assembly 300 includes signal lines, e.g., gate lines $G_n$ and data lines $D_m$ (FIG. 3) and a pixel PX connected to the signal lines. A plurality of the pixels PX includes pixels PX arranged in a substantially matrix pattern, e.g., in pixel rows and columns, as shown in FIG. 1. As shown in FIG. 2, the liquid crystal substrate assembly 300 includes a first substrate 100, e.g., a lower substrate 100, and a second substrate 200, e.g., an upper substrate 200, which faces, e.g., is disposed opposite to, the lower substrate 100, and a liquid crystal layer 3 interposed therebetween.

The signal lines include a plurality of gate lines $G_i$ through $G_m$, that transmit the gate signal Vg (also referred to as "a scanning signal") and a plurality of pairs of data lines $D_j$ and $D_{j+1}$ that transmit the data voltage Vd. The gate lines Gi extend along a first direction, which, in an exemplary embodiment, is a row direction (as viewed in FIGS. 1 and 3), and are substantially parallel to each other. The pairs of data lines $D_j$ and $D_{j+1}$ extend along a second direction, which in an exemplary embodiment is a column direction substantially perpendicular to the first direction, and are substantially parallel to each other, as shown in FIG. 3.

Each of the pixels PX is connected to one of the gate lines and a pair of the data lines. Specifically, as shown in FIG. 3, for example, a pixel PX is connected to an i-th (where i=1, 2, ..., n) gate line $G_i$, as well as a j-th and a (j+1)-th (where j=1, 2, ..., m) data line $D_j$ and $D_{j+1}$, respectively. In addition, each pixel PX includes a first switching device Qa connected to the i-th gate line $G_i$ and the j-th data line $D_j$, and a second switching device Qb connected to the I-th gate line $G_i$ and the (j=1)=th data line $D_{j+1}$. A liquid crystal capacitor Clc is connected between the first switching device Qa and the second switching device Qb, while a first storage capacitor Csta and a second storage capacitor Cstb are connected between ground and the first switching device Qa and the second switching device Qb, respectively. In another exemplary embodiment, the first storage capacitor Csta and/or the second storage capacitor Cstb may be omitted.

In an exemplary embodiment, the first switching device Qa and the second switching device Qb are both a three-terminal device, such as a thin-film transistor ("TFT"), for example, disposed on the lower substrate 100. More particularly, as shown in FIG. 3, a control terminal of each of the first switching device Qa and the second switching device Qb is connected to the i-th gate line Gi, and an input terminal of the first switching device Qa is connected to the j-th data line $D_j$, while an input terminal of the second switching device Qb is connected to the (j+1)-th data line $D_{j+1}$. An output terminal of the first switching device Qa is connected to the liquid crystal capacitor Clc and the first storage capacitor Csta, while an output terminal of the second switching device Qb is connected to the liquid crystal capacitor Clc and the second storage capacitor Cstb.

Referring now to FIGS. 2 and 3, each of the pixels PX includes a main pixel electrode 191, which includes a first pixel electrode 191a and a second pixel electrode 191b. Together, the first pixel electrode 191a and the second pixel electrode 191b form the liquid crystal capacitor Clc. The liquid crystal layer 3, disposed between both the first pixel electrode 191a and the second pixel electrode 191b, and the upper substrate 200, serves as a dielectric material.

The first pixel electrode 191a is connected to the first switching device Qa and the second pixel electrode 191b is connected to the second switching device Qb.

The liquid crystal layer 3 has dielectric anisotropy, and liquid crystal molecules 31 (FIG. 4) of the liquid crystal layer 3 have longitudinal axes that are aligned substantially perpendicular to, e.g., substantially vertical with respect to, a plane defined by surfaces of the first substrate 100 and the second substrate 200 when an electric field an electric field is not applied to the liquid crystal molecules 31.

As will be described in greater detail below with reference to FIGS. 7B and 8B, the main pixel electrode 191, which includes the first pixel electrode 191a and the second pixel electrode 191b, is disposed in, e.g., is formed in, a same layer of the lower substrate 100. The first storage capacitor Csta and/or the second storage capacitor Cstb assist the liquid crystal capacitor Clc in holding a charge stored therein, and may be formed by superimposing separate electrodes (not shown) disposed on the lower substrate 100 and interposed between the first pixel electrode 191a, the second pixel electrode 191b and insulators (not shown).

In an exemplary embodiment, the HT-VA LCD displays a color image, in which a desired color is displayed by a spatial sum or, alternatively, a temporal sum of primary colors (e.g., red, green and blue colors) that the pixels PX display. Specifically, each of the pixels PX may display one of the primary colors at any given time (spatial division) or, alternatively, each of the pixels PX may alternately display each of the primary colors over time (temporal division).

More specifically, as shown in FIG. 2, for spatial division color display, each pixel PX includes a color filter CF that displays one of the three primary colors in an area of the upper substrate 200 corresponding to the first pixel electrode 191a and the second pixel electrode 191b, for example. Alternatively, the color filter CF may be disposed above or below the first pixel electrode 191a and the second pixel electrode 191b of the lower substrate 100, as will be described in greater detail below with reference to FIGS. 7B and 8B.

At least one polarizer (not shown) is disposed on the liquid crystal substrate assembly 300.

Referring again to FIG. 1, the gray voltage generator 800 generates all gray voltages or, alternatively, a limited number of gray voltages related to transmittance values of the pixel PX (hereinafter collectively referred to as "reference gray voltages").

The reference gray voltages may include gray voltages having a positive value and gray voltages having a negative value with respect to a common voltage Vcom that is provided to the liquid crystal substrate assembly 300.

The gate driver 400 is connected to the gate lines $G_n$ of the liquid crystal substrate assembly 300, and applies the gate signal Vg, which includes a gate-on voltage Von and a gate-off voltage Voff, for example, to the gate lines $G_n$.

The data driver 500 is connected to the data lines $D_m$ of the liquid crystal substrate assembly 300, and selects a reference gray voltage, supplied from the gray voltage generator 800, and applies the selected reference gray voltage as the data voltage Vd to the each of the data lines $D_m$.

In an exemplary embodiment in which the gray voltage generator 800 provides the limited number of reference gray voltages (instead of all the gray voltages), the data driver 500 may generate desired data voltages Vd by dividing the limited number of reference gray voltages using, a voltage divider (not shown), for example.

The signal controller 600 controls the gate driver 400 and the data driver 500.

The gate driver 400, the data driver 500, the signal controller 600 and the gray voltage generator 800 (hereinafter collectively referred to as "the drivers 400, 500, 600, and 800") may be mounted, individually or collectively, directly on the liquid crystal substrate assembly 300 in the form of at least one integrated circuit ("IC") chip, which may be mounted on a flexible printed circuit film ("FPCF") (not shown) attached to the liquid crystal substrate assembly 300 in the form of a tape carrier package ("TCP"), or alternatively, may be mounted on a separate printed circuit board ("PCB") (not shown).

Alternatively, the drivers 400, 500, 600, and 800 may be integrated into the liquid crystal substrate assembly 300 with signal lines (the gate lines $G_n$ and the data lines $D_m$, for example) and thin-film transistor switching elements (the first switching device Qa and the second switching device Qb, for example).

Further, the drivers 400, 500, 600 and 800 may be integrated in the form of a single chip. In this case, at least one of the drivers 400, 500, 600, and 800, or at least one circuit element included in at least one of the drivers 400, 500, 600, and 800, may be disposed outside of the single chip, but it will be noted that additional exemplary embodiments are not limited to the foregoing description or configurations of the drivers 400, 500, 600, and 800.

Figure 4:
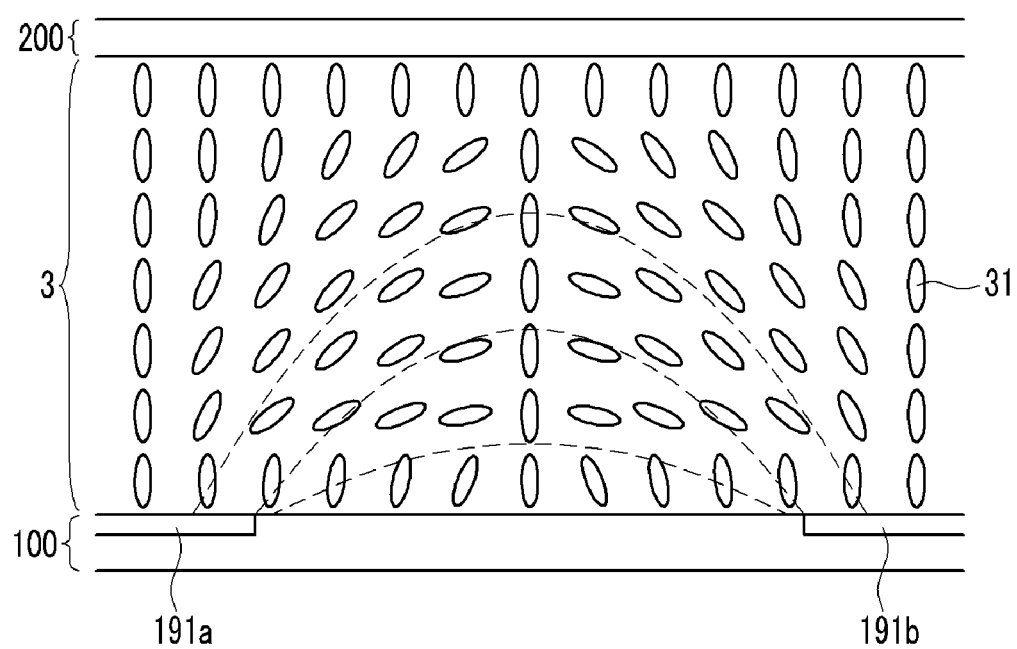
FIG. 4 is a partial cross-sectional view of a an exemplary embodiment of a liquid crystal display according to the present invention.
Figure 5:
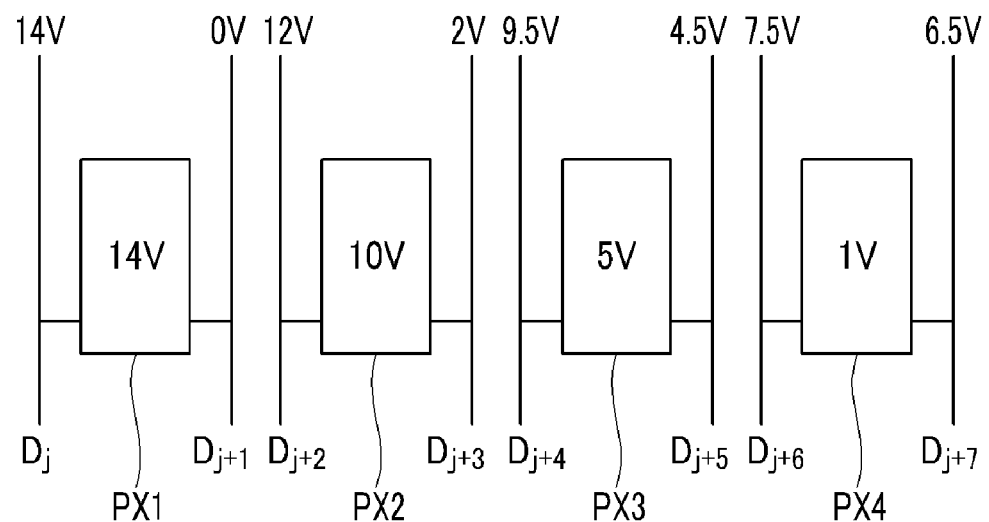
FIG. 5 is plan view of an exemplary embodiment of data lines and pixels, and voltages thereof, in a liquid crystal display according to the present invention.

FIG. 4 is a partial cross-sectional view of a an exemplary embodiment of a liquid crystal display according to the present invention, and FIG. 5 is plan view of an exemplary embodiment of data lines and pixels, and voltages thereof, in a liquid crystal display according to the present invention. Hereinafter, an exemplary embodiment of a driving method of the HT-VA LCD will be described in further detail with reference to FIGS. 1-5.

Referring to FIG. 1, the signal controller 600 receives input image signals R, G and B and input control signals that control display of the input image signals R, G and B from an external device, such as a graphics controller (not shown).

The input image signals R, G and B contain luminance information for each pixel PX, and the luminance has a predetermined number of gray levels, such as 1024 ($=2^{10}$), 256 ($=2^8$) or 64 ($=2^6$) gray levels, for example, but not being limited thereto.

The input control signals may include a vertical synchronization signal Vsync, a horizontal synchronization signal Hsync, a main clock signal MCLK and a data enable signal DE, for example.

The signal controller 600 processes the input image signals R, G and B, according to an operating condition of the liquid crystal substrate assembly 300, based on the input image signals R, G and B and the input control signals. The signal controller 600 generates a gate control signal CONT1 and a data control signal CONT2, and outputs the gate control signal CONT1 to the gate driver 400 and the data control signal CONT2 and processed image signals, e.g., digital image signals DAT, to the data driver 500, as shown in FIG. 1.

According to the data control signal CONT2 supplied from the signal controller 600, the data driver 500 receives the digital image signals DAT for a pixel PX of one row of PXs in the liquid crystal substrate assembly 300, and converts each digital image signal DAT into the data voltage Vd, which is an analog voltage, by selecting a gray voltage corresponding to each digital image signal DAT, and then supplies the analog data voltages Vd to the corresponding data lines $D_m$.

The gate driver 400 applies the gate-on voltage Von to the gate lines $G_n$ according to the gate control signal CONT1 from the signal controller 600 to turn on the first switching device Qa and the second switching device Qb connected to a corresponding gate line, such as to the i-th gate line $G_i$ (FIG. 3).

The data voltages Vd are thereby supplied to the j-th data line $D_j$ and the (j+1)-th data line $D_{j+1}$ to be applied to the corresponding pixel PX through the first switching device Qa and the second switching device Qb, respectively, which are turned on by the gate-on voltages Von applied to the control terminals thereof.

Thus, the data voltage in the j-th data line $D_j$ is supplied to the first pixel electrode 191a through the first switching device Qa, and the data voltage in the second data line $D_{j+1}$ is applied to the second pixel electrode 191b through the second switching device Qb.

As discussed above, the data voltages applied to the first pixel electrode 191a and the second pixel electrode 191b are data voltages corresponding to a luminance displayed by the pixels PX (having the first pixel electrode 191a and the second pixel electrode 191b), and have polarities opposite to each other with respect to the common voltage Vcom. In an exemplary embodiment, the data voltages applied to the first pixel electrode 191a and the second pixel electrode 191b may be same polarities.

A difference between the two data voltages (having different polarities or same polarities), which are applied to the first pixel electrode 191a and the second pixel electrode 191b, is a charging voltage of the liquid crystal capacitor Clc, e.g., is a pixel voltage.

When a potential difference is generated between two terminals of the liquid crystal capacitor Clc, an electric field, aligned substantially parallel to the surfaces of the lower substrate 100 and the upper substrate 200, is generated in the liquid crystal layer 3 between the first pixel electrode 191a and the second pixel electrode 191b, as shown in FIG. 4.

In an exemplary embodiment in which the liquid crystal molecules 31 have a positive dielectric anisotropy, the liquid crystal molecules 31 are inclined so that longitudinal axes thereof are aligned to be substantially parallel to the direction of the electric field, and an inclination degree of the liquid crystal molecules 31 thereby depends on an amplitude of the pixel voltage.

In this case, the liquid crystal layer 3 is referred to as an electrically-induced optical compensation ("EOC") mode liquid crystal layer 3. In the EOC mode, a degree of variation of polarization of light, supplied from a backlight unit (not shown), for example, that passes through the liquid crystal layer 3 depends on the inclination degree of the liquid crystal molecules 31.

The variation of the polarization is expressed by a variation in transmittance of light through the polarizers (not shown), through which the pixel PX thereby displays a luminance, corresponding to a gray level of the image signal DAT, to display a desired image on the HT-VA LCD according to an exemplary embodiment.

By repeating the process described above in units of one (1) horizontal period ("1H"), which is equal to one period of the horizontal synchronization signal Hsync and the data enable signal DE, the gate-on signal Von is sequentially applied to all the gate lines $G_n$ and the data voltages are applied to all the pixels PXs via the data lines $D_m$, thereby to display one frame of the desired image.

After one frame is displayed, a next frame starts. An inversion signal RVS, which is supplied to the data driver 500, is controlled so that the polarity of the data voltage applied to each pixel PX is reversed (e.g., to be opposite a polarity of the data voltage applied to the same pixel PX in a previous frame), which is referred to as "frame inversion."

In an exemplary embodiment, polarity of the data voltage flowing in one data line may be periodically changed during one frame according to a characteristic of the inversion signal RVS (to utilize, for example, row inversion or dot inversion) or, alternatively, the polarities of the data voltages applied to one pixel row may be alternated and different from each other (e.g., column inversion).

FIG. 5, is plan view illustrating voltages applied to data lines $D_j$ through $D_{j+7}$ when charging voltages of the liquid crystal capacitors Clc (FIGS. 2 and 3) of first through fourth adjacent pixels PX1, PX2, PX3 and PX4 are 14 volts (V), 10V, 5V and 1V, respectively, and a minimum voltage and a maximum voltage that the LCD uses are 0V and 14V, respectively, in the HT-VA LCD according to an exemplary embodiment of the present invention. In an exemplary embodiment, the maximum voltage of the charged pixel may be greater than the 14V according to a power controller (not shown) or the gray voltage generator 800.

Referring to FIG. 5, each of the four adjacent pixels PX1 through PX4 is connected to two data lines, e.g., the first pixel PX1 is connected to a pair of data lines $D_j/D_{j+1}$, the second pixel PX2 is connected to a pair of data lines $D_{j+2}/D_{j+3}$, the third pixel PX3 is connected to a pair of data lines $D_{j+4}/D_{j+5}$, and the fourth pixel PX4 is connected to a pair of data lines $D_{j+6}/D_{j+7}$. Different data voltages having different polarities with respect to the common voltage Vcom (which in the exemplary embodiment shown in FIG. 5 is 7V), are applied to the pairs of data lines $D_j/D_{j+1}$, $D_{j+2}/D_{j+3}$, $D_{j+4}/D_{j+5}$, and $D_{j+6}/D_{j+7}$ connected to the first pixel PX1, the second pixel PX2, the third pixel PX3 and the further pixel PX4, respectively. A difference between the two data lines is the pixel voltage (discussed above) in each of the four adjacent pixels PX1 through PX4. Specifically, when the common voltage Vcom is 7V, for example: 14V and 0V are applied to the data lines $D_j$ and $D_{j+1}$, respectively, for a target pixel voltage of the first pixel PX1 being 14V; 12V and 2V are applied to the data lines $D_{j+2}$ and $D_{j+3}$, respectively, for a target pixel voltage of the second pixel PX2 being 5V; 9.5V and 4.5V are applied to the data lines $D_{j+4}$ and $D_{j+5}$, respectively, for a target pixel voltage of the third pixel PX3 being 5V; and 7.5V and 6.5V are applied to the data lines $D_{j+6}$ and $D_{j+7}$, respectively, for a target pixel voltage of the fourth pixel PX4 being 1V.

Thus, by applying two data voltages, having different polarities from each other with respect to the common voltage Vcom, to one pixel PX, a driving voltage is increased, a response speed of the liquid crystal molecules 31 is substantially improved, and a transmittance of the HT-VA LCD according to the exemplary embodiments described herein is significantly improved. Further, since the two data voltages, applied to the one pixel PX, have polarities that are opposite to each other, deterioration of an image quality of the HT-VA LCD, due to flickers, for example, is substantially reduced and/or is effectively prevented, and even when the data driver 500 drives the HT-VA LCD in a column or row inversion method each of the pixels has different polarity substantially similar to the dot inversion.

In addition, when the first switching device Qa and the second switching device Qb are turned off in one pixel PX, the voltages applied to the first pixel electrode 191a and the second pixel electrode 191b drop simultaneously, due to respective kickback voltages, and, accordingly, there is little variation in the charging voltage of the pixel PX. Accordingly, the display characteristics of the HT-VA LCD according to an exemplary embodiment are further improved.

Furthermore, since the liquid crystal molecules 31 of the HT-VA LCD are aligned substantially vertically with respect to the surfaces of the first substrate 100 and the second substrate 200, the contrast ratio is substantially improved. Additionally, since the liquid crystal molecules 31 (having positive dielectric anisotropy) have a dielectric anisotropy that is increased, and a rotational viscosity that is decreased (as compared to liquid crystal molecules 31 having a negative dielectric anisotropy), a response speed of the liquid crystal molecules 31 is further improved in an exemplary embodiment of the HT-VA LCD according to the present invention. Also, since tilt directions of the liquid crystal molecules 31 are easily set, based on a direction of the electric field generated between the pixel electrodes, the HT-VA LCD retains excellent display characteristics, even when an alignment of the liquid crystal molecules 31 is scattered due to external forces or influences, for example.

Hereinafter, an exemplary embodiment of the liquid crystal substrate assembly 300 will be described in further detail with reference to FIGS. 6, 7A and 7B.

Figure 6:
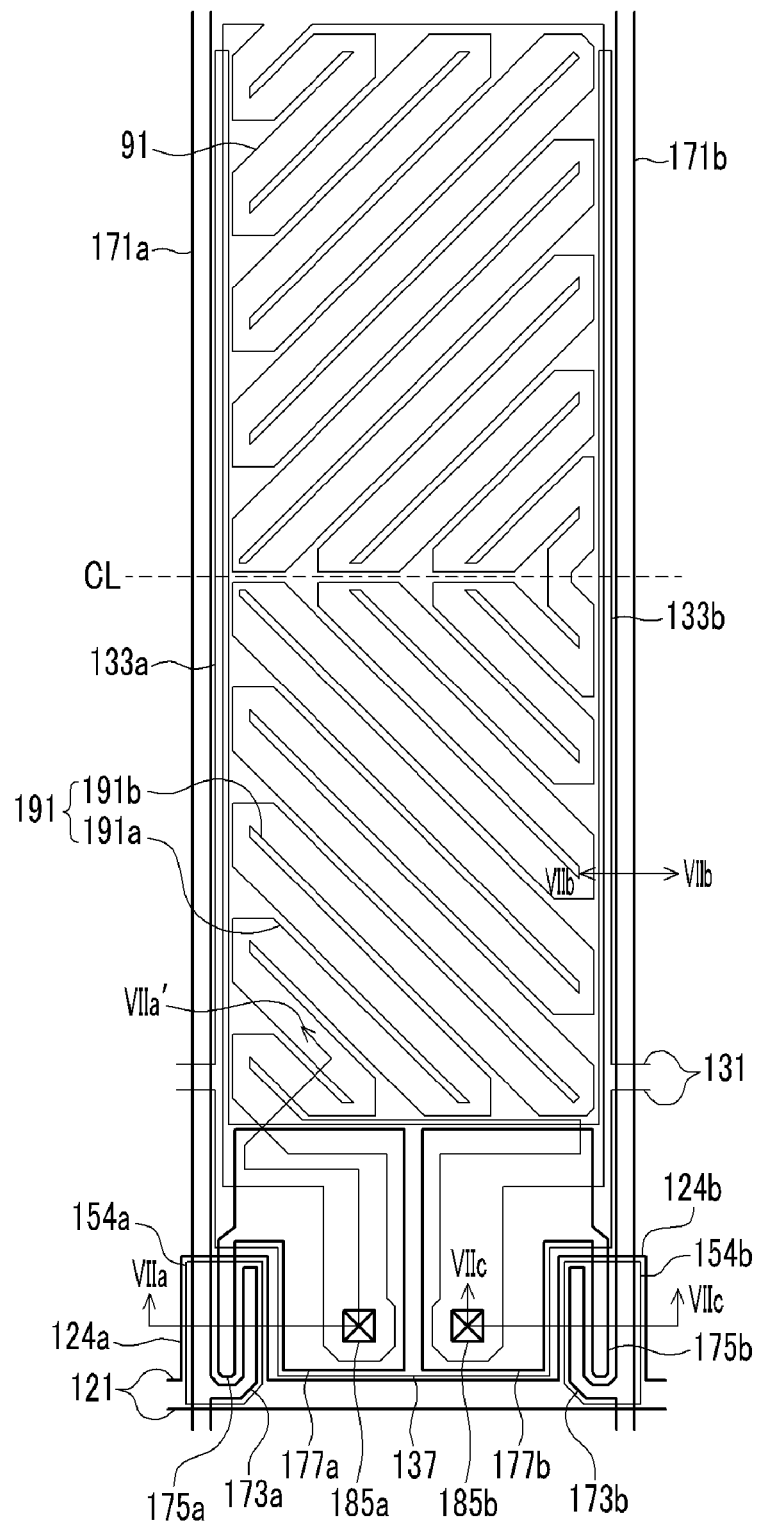
FIG. 6 is a plan view of an exemplary embodiment of a liquid crystal substrate assembly according to the present invention.
Figure 7A:
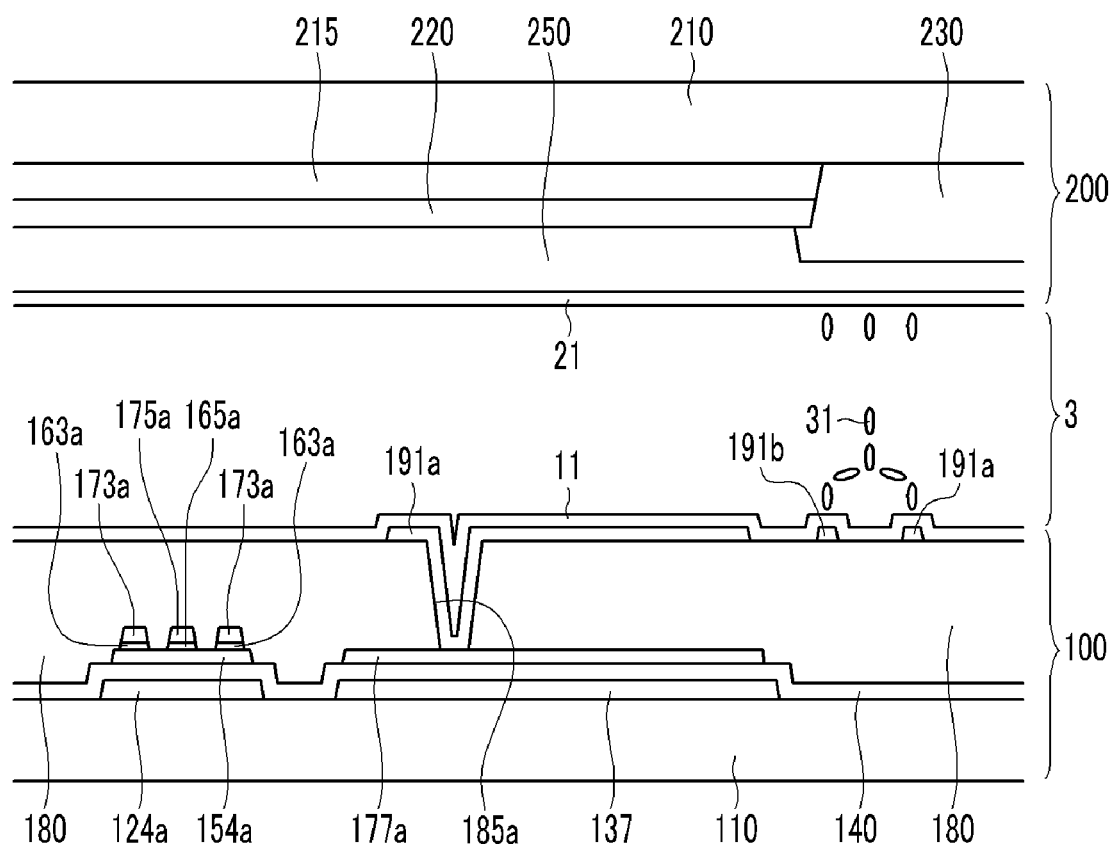
FIG. 7A is a partial cross-sectional view taken along line VIIa-VIIa' of FIG. 6.
Figure 7B:
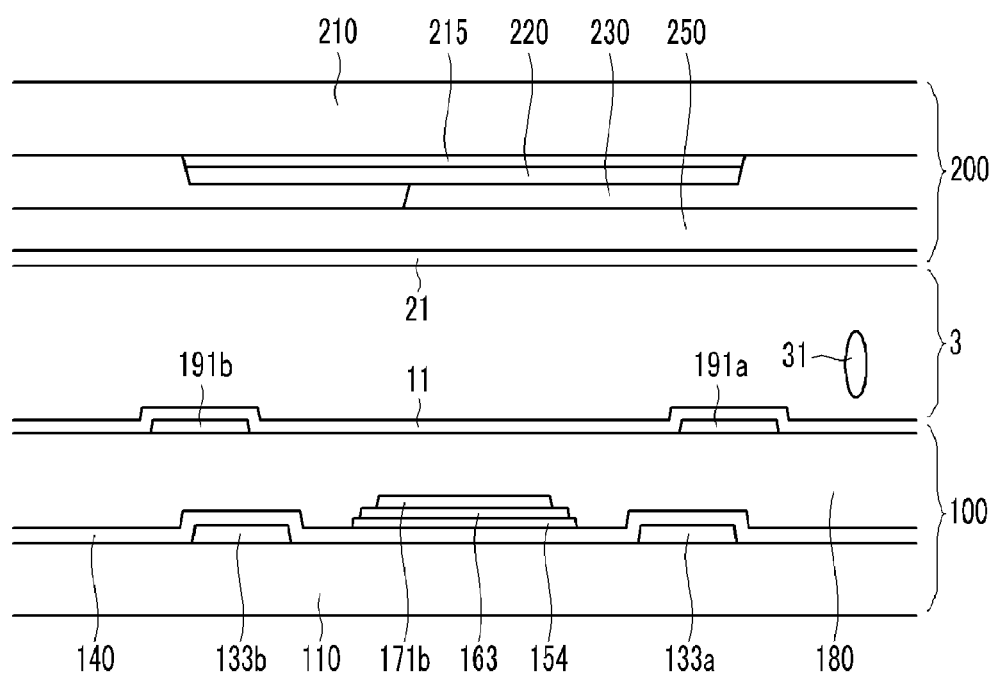
FIG. 7B is a partial cross-sectional view taken along line VIIb-VIIb' of FIG. 6.
Figure 7C:
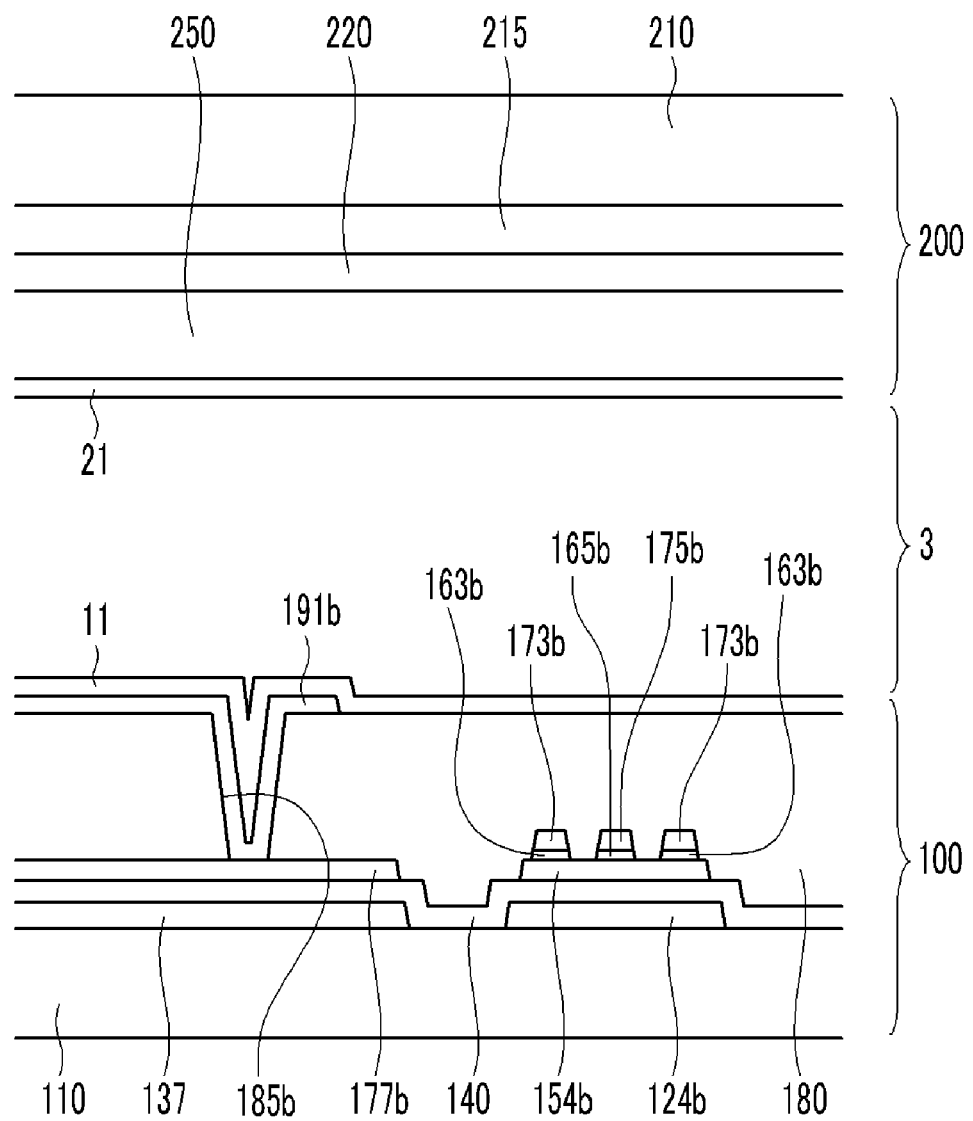
FIG. 7C is a partial cross-sectional view taken along line VIIc-VIIc' of FIG. 6.

FIG. 6 is a plan view of an exemplary embodiment of the liquid crystal substrate assembly 300 according to the present invention, FIG. 7A is a partial cross-sectional view taken along line VIIa-VIIa' of FIG. 6, FIG. 7B is a partial cross-sectional view taken along line VIIb-VIIb' of FIG. 6, and FIG. 7C is a partial cross-sectional view taken along line VIIc-VIIc' of FIG. 6. The same references characters in FIGS. 6, 7A and 7B indicate the same or like components as described in greater detail above with reference to FIGS. 1-6; accordingly, any repetitive detailed description thereof will hereinafter be omitted or simplified.

Referring to FIGS. 6, 7A, 7B, and 7C, the liquid crystal substrate assembly according to an exemplary embodiment of the present invention includes a first substrate 100, e.g., a lower substrate 100, and a second substrate 200, e.g., an upper substrate 200, and a liquid crystal layer 3 interposed therebetween.

The lower substrate 100 includes a plurality of gate conductors, which include gate lines 121 and storage electrode lines 131, disposed on a first insulation substrate 110.

The gate lines 121 transmit gate signals and extend primarily along a first direction, e.g., a horizontal direction (as viewed in FIG. 6). Each of the gate lines 121 includes pairs of first gate electrodes 124a and second gate electrodes 124b projecting from the gate line 121 (e.g., projecting upward, or vertically, as viewed in FIG. 6).

Each of the storage electrode lines 131 receives a predetermined voltage, such as the common voltage Vcom, for example, and extends primarily along the horizontal direction (as shown in FIG. 6). Each of the storage electrode lines 131 is disposed between two adjacent, e.g., neighboring, gate lines 121. In addition, the storage electrode line 131 is disposed closer to the lower gate line 121 of the two adjacent gate lines 121, as shown in FIG. 6 (put another way, for a given main pixel electrode 191, the associated storage electrode line 131 is disposed below an imaginary horizontal center line CL, e.g., a transverse center line CL, of the main pixel electrode 191). Each storage electrode line 131 includes pairs of first storage electrodes 133a and second storage electrodes 133b that extend upward vertically from the storage electrode line 131, and a storage extension part 137 that extends downward and horizontally across a lower portion of each pixel PX (FIG. 1) and having a wide area, relative to other portions of the storage electrode line 131 and the first storage electrode 133a and the second storage electrode 133b, below the main pixel electrode 191.

As shown in FIG. 6, the first storage electrodes 133a and the second storage electrodes 133b are formed in a rod shape, e.g., a rectilinear shape, and extend from the vicinity of the first gate electrode 124a and the second gate electrode 124b, respectively, of a lower gate line 121 (of a pair of adjacent gate lines 121) to the vicinity of an upper gate line 121 (of a pair of adjacent gate lines 121). As also shown in FIG. 6, the storage extension part 137 has a substantially rectangular shape in which two corners thereof, formed in a lower part of the storage extension part 137, are cut, e.g., include cut-outs around the first gate electrode 124a and the second gate electrode 124b. Thus, in an exemplary embodiment, the storage extension part 137 connects lower ends of the first storage electrode 133a and the second storage electrode 133b to each other. However, the shape and arrangement of the storage electrode line 131, including the first storage electrode 133a and the second storage electrode 133b and the storage extension part 137, is not limited to the foregoing description or as shown in FIG. 6, and may be changed in various forms in additional exemplary embodiments.

In an exemplary embodiment, the gate lines 121, including the first gate electrode 124a and the second gate electrode 124b, and/or the storage electrode lines 131, including the first storage electrode 133a and the second storage electrode 133b and the storage extension part 137, may be a single layered structure or, alternatively, may be a multilayered structure.

A gate insulating layer 140 made of silicon nitride (SiNx) or silicon oxide (SiOx), for example, is disposed on the gate lines 121, including the first gate electrode 124a and the second gate electrode 124b, and the storage electrode lines 131, including the first storage electrode 133a and the second storage electrode 133b and the storage extension part 137.

Pairs of first island-type semiconductors 154a and second island-type semiconductors 154b, which, in an exemplary embodiment, are made of hydrogenated amorphous silicon ("a-Si") or polysilicon ("p-Si"), for example, are disposed on the gate insulating layer 140. The first semiconductor 154a and the second semiconductor 154b are disposed positioned above the first gate electrode 124a and the second gate electrode 124b, respectively, as shown in FIG. 6.

First ohmic contacts 163a, 165a, 163b, and 165b, which in an exemplary embodiment are island-type ohmic contacts, are disposed on the first semiconductors 154a, and second ohmic contacts (not shown), which may also be island-type ohmic contacts, are disposed on the second semiconductors 154b. The first ohmic contacts 163a, 165a, 163b, and 165b may be made of a material such as n+hydrogenated amorphous silicon doped with n-type impurities at a high concentration, for example, or of silicide, although additional exemplary embodiments are not limited thereto.

A data conductor, including pairs of first data lines 171a and second data lines 171b and pairs of first drain electrodes 175a and second drain electrodes 175b, is disposed on the first ohmic contacts 163a, 165a, 163b, and 165b and the gate insulating layer 140.

The first data line 171a and the second data line 171b transmit the data signals, e.g., the data voltage Vd (FIG. 1), and intersect the gate lines 121 and the storage electrode lines 131, while extending primarily along the vertical direction (as viewed in FIG. 6). As shown in FIG. 6, the first data line 171a and the second data line 171b include a first source electrode 173a and a second source electrode 173b, respectively, which extend from the first data line 171a and the second data line 171b, respectively, and are bent to form a "U" shape around the first drain electrode 175a and the second drain electrode 175b, respectively, proximate to, e.g., above, the first gate electrode 124a and the second gate electrode 124b, respectively.

The first drain electrode 175a and the second drain electrode 175b include a first extension part 177a and a second extension part 177b, respectively, ends of which have a rectilinear shape and a large area, relative to an area of the first drain electrode 175a and the second drain electrode 175b. Ends of the first drain electrode 175a and the second drain electrode 175b, which are opposite the first extension part 177a and the second extension part 177b, are partially surrounded by the first source electrode 173a and the second source electrode 173b that are bent to face the first data line 171a and the second data line 171b above the first gate electrode 124a and the second gate electrode 124b, respectively. Outer contours of a periphery of the first extension part 177a and the second extension part 177b are substantially similar to those of the storage extension part 137 disposed below the first extension part 177a and the second extension part 177b. The first extension part 177a overlaps the left half of the storage extension part 137, and the second extension part 177b overlaps the right half of the storage extension part 137.

Referring still to FIG. 6, the first and second gate electrodes 124a and 124b, the first and second source electrodes 173a and 173b, and the first and second drain electrodes 175a and 175b, together with the first and second semiconductors 154a and 154b, form the first and second switching devices Qa and Qb (FIG. 3), respectively. Channels of the first and second switching devices Qa and Qb are respectively formed in the first and second semiconductors 154a and 154b between the first and second source electrodes 173a and 173b and the first and second drain electrodes 175a and 175b, respectively.

In an exemplary embodiment, the first data line 171a, the second data line 171b, the first drain electrode 175a and the second drain electrode 175b (hereinafter collectively referred to as "the data conductors 171a, 171b, 175a and 175b") may be single layered structures or, alternatively, may be multilayered structures.

The first ohmic contacts 163a, 165a, 163b, and 165b are formed only between the first semiconductors 154a and the second semiconductors 154b, which are formed below the first ohmic contacts 163a, 165a, 163b, and 165b, and the data conductors 171a, 171b, 175a and 175b, which are formed above the first ohmic contacts 163a, 165a, 163b, and 165b. The first ohmic contacts 163a, 165a, 163b, and 165b lower a contact resistance between the first semiconductors 154a and the second semiconductors 154b and the data conductors 171a, 171b, 175a and 175b. The first semiconductors 154a and the second semiconductors 154b are exposed between the first source electrodes 173a and the second source electrodes 173b and the first drain electrodes 175a and the second drain electrodes 175b, respectively. In addition, the first semiconductors 154a and the second semiconductors 154b are exposed to the data conductors 171a, 171b, 175a and 175b.

A passivation layer 180, made of an inorganic insulator or an organic insulator, for example, is formed on the data conductors 171a, 171b, 175a and 175b and the exposed parts of the first semiconductors 154a and the second semiconductors 154b.

First contact holes 185a and second contact holes 185b, which expose the first extension part 177a and the second extension part 177b, respectively, are formed in the passivation layer 180.

A plurality of the main pixel electrodes 191, each including a first pixel electrode 191a and a second pixel electrode 191b, which may be made of a transparent material such as indium tin oxide ("ITO") or indium zinc oxide ("IZO"), for example, or, alternatively, a reflective metal such as aluminum (Al), silver (Ag), chromium (Cr) or an alloy/alloys thereof, but not being limited thereto, are formed on the passivation layer 180.

As shown in FIG. 6, a periphery of the main pixel electrode 191 has a substantially rectilinear shape. The first pixel electrode 191a and the second pixel electrode 191b engage with each other, e.g., are interdigitated, with a gap 91 formed between the interdigitated members thereof, as will be described in greater detail below. In an exemplary embodiment, the first pixel electrode 191a and the second pixel electrode 191b are substantially vertically symmetrical with respect to the horizontal, e.g., transverse, center line CL and are divided into upper and lower regions above and below the horizontal center line CL, respectively, but additional exemplary embodiments are not limited thereto, e.g., in an alternative exemplary embodiment, the first pixel electrode 191a and the second pixel electrode 191b are asymmetric.

Referring again to FIG. 6, the first pixel electrode 191a includes a lower projection portion extending upward (as viewed in FIG. 6) from the first contact hole 185a toward the horizontal center line CL and then to the left (again, and hereinafter, as viewed in FIG. 6) toward the first data line 171a, a left longitudinal stem portion extending upward from the lower projection portion substantially parallel to and proximate to the first data line 171a, a center transverse stem portion extending to the right toward the second data line 171b along the transverse center line CL from a center portion of the longitudinal stem portion, and a plurality of branch portions. Branch portions of the plurality of branch portions disposed above the horizontal center line CL extend obliquely and in an upper right direction, e.g., toward an upper right corner of the pixel PX (FIG. 1) including the main pixel electrode 191 therein, from the longitudinal stem portion or the center transverse stem portion, as shown in FIG. 6. Other branch portions of the plurality of branch portions, disposed below the horizontal center line CL, extend obliquely in a lower right direction (e.g., toward a lower right corner of the pixel PX) from the longitudinal stem portion or the center transverse stem portion. In an exemplary embodiment, angles formed between the branch portions and the gate line 121 or the horizontal center line CL may be approximately 45 degrees, but additional exemplary embodiments are not limited thereto.

Still referring to FIG. 6, the second pixel electrode 191b includes a lower projection portion that extends upward (as viewed in FIG. 6) from the second contact hole 185b toward the horizontal center line CL and then to the right toward the second data line 171b, a right longitudinal stem portion extending upward from the lower projection portion substantially parallel to and proximate to the second data line 171b, an upper transverse stem portion, extending horizontally to the left from an upper portion of the right longitudinal stem portion, a lower transverse stem portion, extending horizontally to the left from a lower portion of the right longitudinal stem portion, and a plurality of branch portions. Branch portions of the plurality of branch portions that are disposed above the horizontal center line CL extend obliquely in a lower left direction from the longitudinal stem portion or the upper transverse stem portion. Branch portions of the plurality of branch portions that are disposed below the horizontal center line CL extend obliquely in an upper left direction from the longitudinal stem portion or the lower transverse stem portion. In an exemplary embodiment, an angle formed between the branch portions of the second pixel electrode 191b and the gate line 121 or the horizontal center line CL may be approximately 45 degrees, but additional exemplary embodiments are not limited thereto. In addition, upper branch portions (e.g., the branch portions that are disposed above the horizontal center line CL) and lower branch portions (e.g., the branch portions that are disposed below the horizontal center line CL) of the second pixel electrode 191b may form about right angles with each other.

As noted above, the branch portions of the first pixel electrode 191a and the second pixel electrode 191b are interdigitated, e.g., engage with each other with the gap 91 therebetween, and are alternately disposed, thereby forming a pectinated pattern, e.g., a comb pattern having narrow, close divisions between the interdigitated members of the first pixel electrode 191a and the second pixel electrode 191b.

Referring again to FIGS. 6 and 7A-7C, the first pixel electrode 191a and the second pixel electrode 191b are physically and electrically connected to the first drain electrode 175a and the second drain electrode 175b, respectively, through the first contact hole 185a and the second contact hole 185b, respectively. The first pixel electrode 191a and the second pixel electrode 191b receive data voltages from the first drain electrode 175a and the second drain electrode 175b, respectively. As discussed above with reference to FIGS. 2 and 3, the first pixel electrode 191a and the second pixel electrode 191b together with the liquid crystal layer 3, form the liquid crystal capacitor Clc. Thus, the first pixel electrode 191a and the second pixel electrode 191b maintain the voltage applied thereto, e.g., the pixel voltage, even after the first thin film transistor Qa and the second thin film transistor Qb are turned off.

The first extension part 177a and the second extension part 177b of the first drain electrode 175a and the second drain electrode 175b, respectively, connected to the first pixel electrode 191a and the second pixel electrode 191b, respectively, overlap the storage extension part 137 with the gate insulating layer 140 interposed therebetween, thereby forming the first storage capacitor Csta and the second storage capacitor Cstb, respectively. The first storage capacitor Csta and the second storage capacitor Cstb strengthen a voltage, e.g., charge, storage capacity of the liquid crystal capacitor Clc.

Still referring to FIGS. 6 and 7A-7C, the upper substrate 200 according to an exemplary embodiment includes a patterned conductive layer 215 disposed on a second insulation substrate 210 made of transparent glass or plastic, for example. The patterned conductive layer 215 may be transparent and, in addition, may be made of tin oxide (SnO), ITO and/or IZO, although additional exemplary embodiments are not limited thereto. Additionally, the patterned conductive layer 215 may be made of a same material as the main pixel electrode 191. In an exemplary embodiment, the patterned conductive layer 215 is formed by depositing a conductive layer on the insulation substrate 210, performing photolithography, etching portions the conductive layer to form portions of the patterned conductive layer 215 that transmit light (e.g., portions in a pixel area) and any remaining other portions of the patterned conductive layer 215 such that the completed patterned conductive layer 215 remains on the upper substrate 200. Thus, in an exemplary embodiment, the patterned conductive layer 215 may be disposed on an edge portion of the pixel and/or may overlap with a light blocking member 220, but the patterned conductive layer 215 is not formed in the pixel area, e.g., the patterned conductive layer 215 is not disposed in an area where it would block light (i.e. reduce the aperture ratio), such as if it were to be disposed over the main pixel electrode 191. In an exemplary embodiment, a pattern of the patterned conductive layer 215 is substantially the same as a pattern of the light blocking member 220. Accordingly, a transmittance of light therethrough is effectively maximized.

In an exemplary embodiment, a thickness of the transparent conductive layer 215 may be from about 200 angstroms (Å) to about 500 Å. In another exemplary embodiment, the thickness of the transparent conductive layer 215 may be about 300 Å, but it will be noted that additional exemplary embodiments are not limited to the aforementioned thicknesses.

In the exemplary embodiments described herein, and as shown in FIG. 7A, the patterned conductive layer 215 is disposed only on portions of the second insulation substrate 210 and, additionally, is disposed within, e.g., not on, the upper substrate 200. Put it another way, the patterned conductive layer 215 according to the present invention is not a planar layer, and more particularly, the patterned conductive layer 215 is not a film formed on an outside surface of a transparent substrate. Moreover, in an exemplary embodiment of the present invention, the patterned conductive layer 215 is electrically floated, e.g., is not connected to other parts of the HT-VA LCD, nor is the patterned conductive layer 215 electrically grounded, for example.

Thus, the HT-VA LCD according to the exemplary embodiments described herein includes the patterned conductive layer 215, which substantially reduces and/or effectively prevents static electricity from being generated in the LCD, since the patterned conductive layer 215 is disposed in the upper substrate 200, which does not include an electrode, such as a common electrode or a pixel electrode, for example, disposed therein. In addition, during a manufacturing process, the HT-VA LCD, or portions thereof (such as the upper substrate 200, with or without the lower substrate 100 and/or the liquid crystal layer 3 disposed therebetween, for example) may be transferred using electrostatic chuck ("ESC") mode chucking, since the patterned conductive layer 215 is conductive.

Still referring to FIGS. 6 and 7A-7C, the upper substrate 200 further includes the light blocking member 220 disposed on the patterned conductive layer 215. The light blocking member 220 prevents light from being leaked between the main pixel electrodes 191 and defines an opening region facing the main pixel electrodes 191. The light blocking member 220 may be made of chromium oxides (CrOx) or organic materials, for example. In an exemplary embodiment, the light blocking member 220 may be a single-layer structure or, in an additional exemplary embodiment, the light blocking member 220 may be a multi-layered structure including, for example, two layers, such as a transparent layer, including molybdenum oxide (MoOx), and an opaque layer, including titanium oxide (TiO) and/or molybdenum (Mo), although other exemplary embodiments are not limited thereto. In yet another additional exemplary embodiment, the light blocking member 220 may be omitted; in this case, the patterned conductive layer 215 is also, e.g., functions as, the light blocking member 220.

Color filters 230 are disposed on the second insulation substrate 210, the patterned conductive layer 215 and the light blocking member 220. Portions of the color filters 230 are disposed within a region surrounded by the light blocking member 220. In an exemplary embodiment, the color filters 230 may be elongated along a row or column direction of the main pixel electrodes 191 (e.g., a row of the pixels PX shown in FIG. 1). As described in further detail above with reference to FIG. 2, each of the color filters 230 may correspond to one of the primary colors (e.g., one of red, green and blue colors).

An overcoat 250 is disposed on the color filters 230 and the light blocking member 220. The overcoat 250 may be made of an organic insulator, for example. The overcoat 250 prevents the color filters 230 from being exposed and provides a flat surface. The overcoat 250 may be omitted in one or more additional exemplary embodiments.

A first alignment layer 11 and a second alignment layer 21 are disposed on inner surfaces of the first substrate 100 and the second substrate 200, respectively. In an exemplary embodiment, the first alignment layer 11 and the second alignment layer 21 may be vertical alignment ("VA") layers.

Column spacers (not shown) may be disposed between the first substrate 100 and the second substrate 200 to maintain a predetermined distance, e.g., gap, between the first substrate 100 and the second substrate 200. The column spacers may be disposed on the first substrate 100 and/or on the second substrate 200, although additional exemplary embodiments are not limited thereto. A sealant or glass frit (not shown) seals the first substrate 100 and the second substrate 200, with the liquid crystal layer 3 (having optical anisotropy, e.g., dielectric anisotropy) interposed between the first substrate 100 and the second substrate 200.

A polarizer (not shown) may be disposed on surfaces, such as outer surfaces, but not being limited thereto, of the first substrate 100 and/or the second substrate 200.

The liquid crystal layer 3, which is interposed between the lower substrate 100 and the upper substrate 200, has positive dielectric anisotropy, as discussed in greater detail above. Thus, liquid crystal molecules 31 of the liquid crystal layer 3 have their longitudinal axes aligned to be substantially vertical to, e.g., perpendicular to, surfaces of the lower substrate 100 and the upper substrate 200 when an electric field is not applied to the liquid crystal layer 3.

When data voltages Vd (FIG. 1), having different polarities, are applied to the first pixel electrode 191a and the second pixel electrode 191b, an electric field is generated substantially parallel to the surfaces of the first substrate 100 and the second substrate 200. The liquid crystal molecules 31 of the liquid crystal layer 3, which are initially aligned to be substantially vertical to the surfaces of the first substrate 100 and the second substrate 200, are re-aligned according to the electric field and, accordingly, the long axes of at least some of the liquid crystal molecules 31 are aligned to be substantially parallel to the electric field, as shown in FIG. 7A, for example. A variation in degree of polarization of light incident to the liquid crystal layer 3 is changed depending on an inclination degree of the liquid crystal molecules 31. Specifically, the variation of the polarization is represented by a variation of transmittance through the polarizers, and the HT-VA LCD according to an exemplary embodiment thereby displays an image.

Thus, as described herein, one or more exemplary embodiments of the present invention provide benefits that include, but are not limited to, preventing the generation of static electricity in the HT-VA LCD without decreasing a transmittance of light therethrough, due to the electrically floated patterned conductive layer 215 disposed on portions of the second insulation substrate 210 and within the upper substrate 200, in which electrodes, such as common and/or pixel electrodes are not formed. In an additional exemplary embodiment, the patterned conductive layer 215 may be electrically connected to another electrode (not shown), e.g., ground. Additionally, the HT-VA LCD according to an exemplary embodiment allows ESC mode chucking during a manufacturing process thereof and, therefore, substrates of the HT-VA CD can be transferred from one manufacturing process to another easily and without damaging the substrates or other portions of the HT-VA LCD.

Figure 8A:
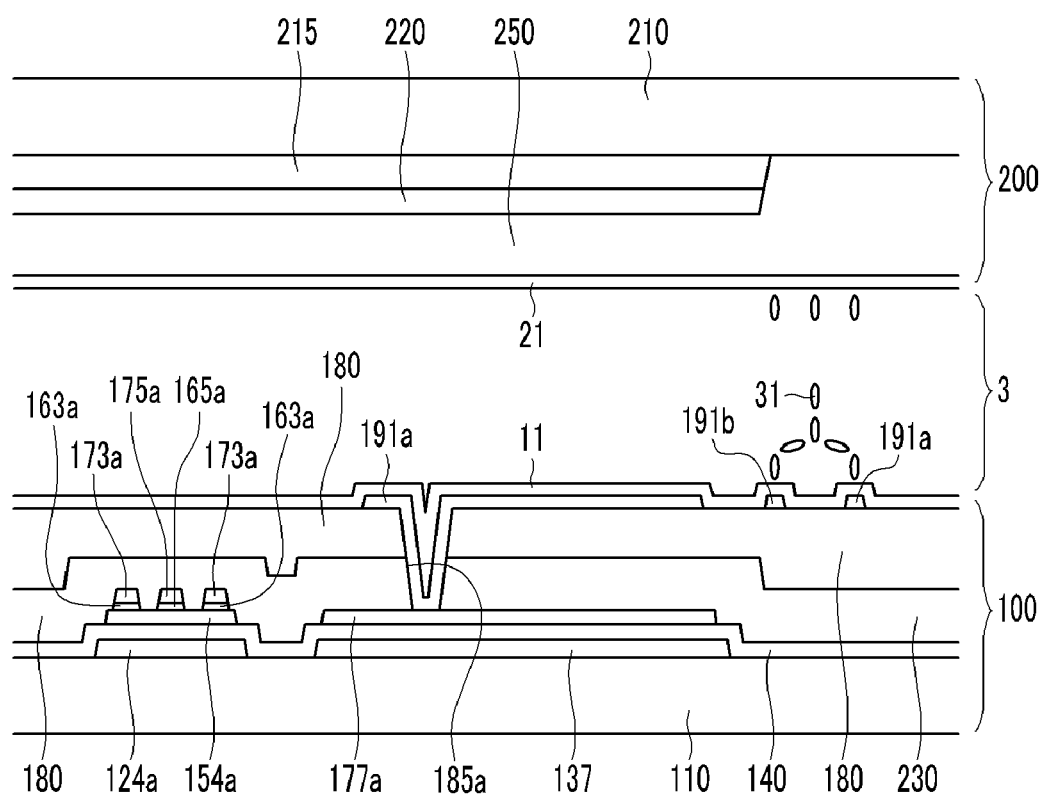
FIG. 8A is a partial cross-sectional view taken along line VIIa-VIIa' of FIG. 6, illustrating another exemplary embodiment of a liquid crystal substrate assembly according to the present invention.
Figure 8B:
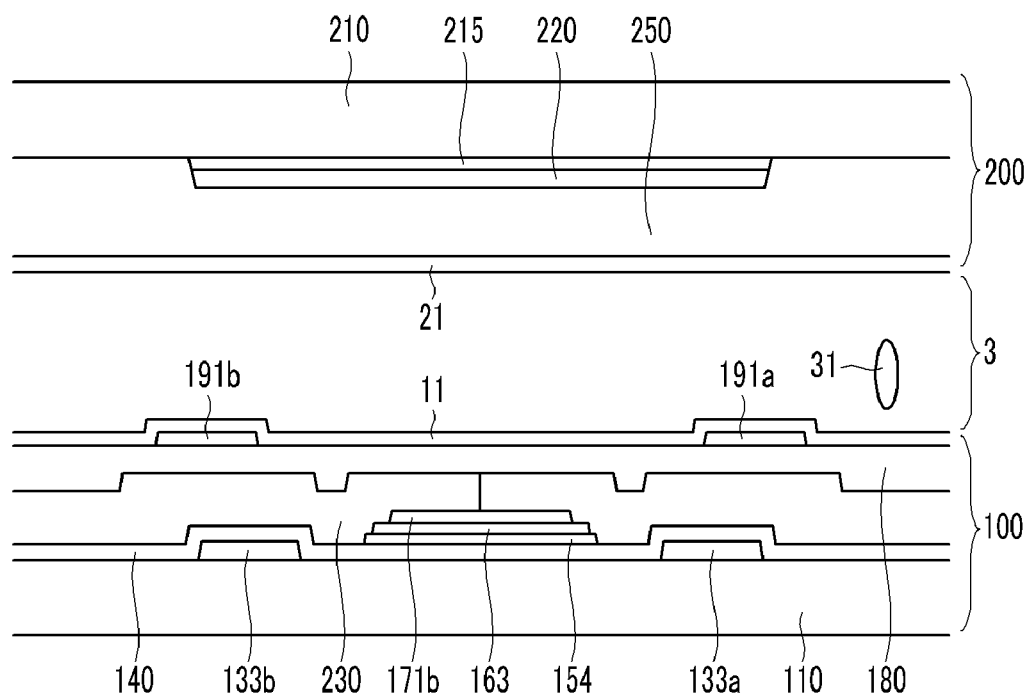
FIG. 8B is a partial cross-sectional view taken along line VIIb-VIIb' of FIG. 6, illustrating another exemplary embodiment of a liquid crystal substrate assembly according to the present invention.
Figure 8C:
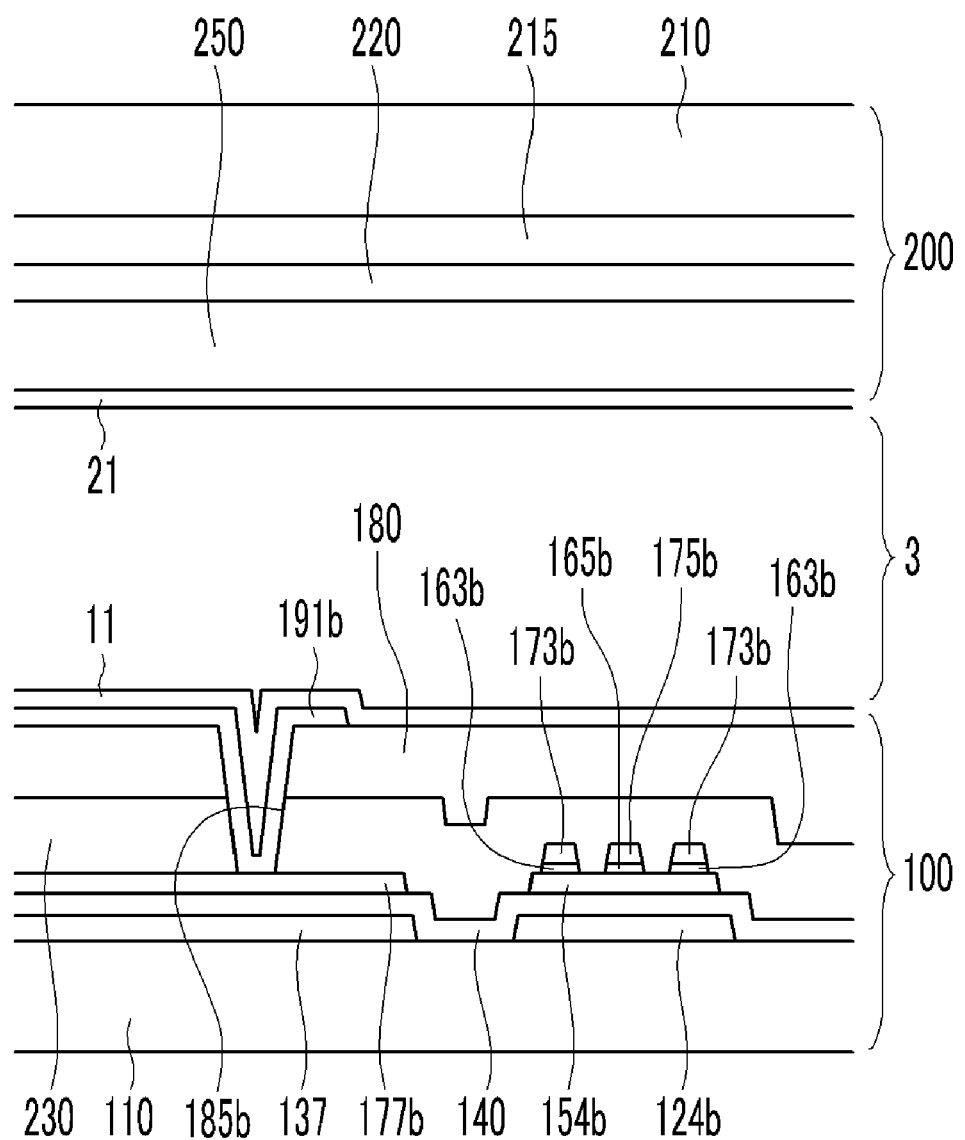
FIG. 8C is a partial cross-sectional view taken along line VIIc-VIIc' of FIG. 6, illustrating another exemplary embodiment of a liquid crystal substrate assembly according to the present invention.

FIG. 8A is a partial cross-sectional view taken along line VIIa-VIIa' of FIG. 6, FIG. 8B is a partial cross-sectional view taken along line VIIb-VIIb' of FIG. 6 and FIG. 8C is a partial cross-sectional view taken along line VIIc-VIIc' of FIG. 6, illustrating another exemplary embodiment of a liquid crystal substrate assembly according to the present invention. FIGS. 8A and 8B illustrate another exemplary embodiment of a liquid crystal substrate assembly according to the present invention. Specifically, as shown in FIGS. 8A and 8B, and as will be described in greater detail below, in an additional exemplary embodiment, the lower substrate 100 includes the color filters 230 (instead of the upper substrate 200).

The same references characters in FIGS. 8A, 8B and 8C indicate the same or like components described in greater detail above with reference to FIGS. 1-7C; accordingly, any repetitive detailed description thereof will hereinafter be omitted or simplified.

Referring to FIGS. 6, 8A, 8B and 8C, a liquid crystal substrate assembly 300 according to one or more additional exemplary embodiments of the present invention includes a liquid crystal layer 3 interposed between a lower substrate 100 and an upper substrate 200. A plurality of gate conductors, including gate lines 121 and storage electrode lines 131 are disposed on a first insulation substrate 110 of the lower substrate 100.

A gate insulating layer 140 made of SiNx or SiOx, for example, is disposed on the gate lines 121 and the storage electrode lines 131. First island-type semiconductors 154a and second island-type semiconductors 154b, made of hydrogenated a-Si, or p-Si, for example, are disposed on the gate insulating layer 140. Color filters 230 are disposed on the gate insulating layer 140 and/or on the first semiconductors 154a and second semiconductors 154b. The color filters 230 are formed or patterned in, the pixel areas, as described above. The color filters 230 each include one of the primary colors (such as red, green and blue). A passivation layer 180, which may be made of an inorganic insulator or an organic insulator, for example, is disposed on the color filter 230. In another exemplary embodiment of the present invention, the color filters 230 may be disposed on the passivation layer 180 (as shown in FIG. 8B). In another exemplary embodiment of the present invention, the color filter 230 may be disposed under the passivation layer 180 (not shown) Data conductors, including pairs of first data lines 171a and second data lines 171b and pairs of first drain electrodes 175a and second drain electrodes 175b, are disposed on the ohmic contacts 163a, 165a, 163b, and 165b and the gate insulating layer 140. A plurality of main pixel electrodes 191, each main pixel electrode 191 including a first pixel electrode 191a and a second pixel electrode 191b, which may be made of a transparent material such as ITO or IZO, for example, or a reflective metal such as Al, Ag, Cr or an alloy/alloys thereof, are disposed on the passivation layer 180.

As described in greater detail above with reference to FIGS. 6 and 7A-7C, the first pixel electrode 191a includes a lower projection portion, a left longitudinal stem portion, a center transverse stem portion and a plurality of branch portions. Likewise, as described above, the second pixel electrode 191b includes a lower projection portion, a right longitudinal stem portion, an upper transverse stem portion, a lower transverse stem portion and a plurality of branch portions. The branch portions of the first pixel electrode 191a and the second pixel electrode 191b are interdigitated, e.g., engage with each other with the gap 91 therebetween, and are alternately disposed, thereby forming a pectinated pattern, e.g., a comb pattern having narrow, close divisions between the interdigitated members of the first pixel electrode 191a and the second pixel electrode 191b.

As shown in FIG. 8A, a patterned conductive layer 215 is disposed on a second insulation substrate 210 made of transparent glass or plastic, for example. The patterned conductive layer 215 may be transparent or opaque and may be made of SnO, ITO IZO, Cr or CrOx, for example. In an exemplary embodiment, the patterned conductive layer 215 may be made of substantially a same material as the main pixel electrode 191. In an exemplary embodiment, the patterned conductive layer 215 is formed by depositing a conductive layer on the insulation substrate 210, performing photolithography, etching portions the conductive layer to form portions of the patterned conductive layer 215 that transmit light (e.g., portions in a pixel area) and any remaining other portions of the patterned conductive layer 215 such that the completed patterned conductive layer 215 remains on the upper substrate 200. Thus, in an exemplary embodiment, the patterned conductive layer 215 may be disposed on an edge portion of the pixel and/or may overlap with a light blocking member 220, but the patterned conductive layer 215 is not formed in the pixel area, e.g., the patterned conductive layer 215 is not disposed in an area where it would transmit light (i.e. reduce the aperture ratio), such as if it were to be disposed over the main pixel electrode 191. In an exemplary embodiment, a pattern of the patterned conductive layer 215 is substantially the same as a pattern of the light blocking member 220. Accordingly, a transmittance of light therethrough is effectively maximized.

In an exemplary embodiment, a thickness of the patterned conductive layer 215 may be from about 200 angstroms (Å) to about 500 Å. In another exemplary embodiment, the thickness of the patterned conductive layer 215 may be about 300 Å, but it will be noted that additional exemplary embodiments are not limited to the aforementioned thicknesses.

In the exemplary embodiments described herein, and as shown in FIG. 7B, the patterned conductive layer 215 is disposed only on portions of the second insulation substrate 210 and, additionally, is disposed within, e.g., not on, the upper substrate 200. To put it another way, the patterned conductive layer 215 according to the present invention is not a planar layer, and more particularly, the patterned conductive layer 215 is not a film formed on an outside surface of a transparent substrate. Moreover, in an exemplary embodiment of the present invention, the patterned conductive layer 215 is electrically floated, e.g., is not connected to other parts of the HT-VA LCD. But additional exemplary embodiments are not been limited thereto, the patterned conductive layer 215 may be electrically grounded, for example.

Thus, the HT-VA LCD according to the exemplary embodiments described herein includes the patterned conductive layer 215, which substantially reduces and/or effectively prevents static electricity from being generated in the LCD, since the patterned conductive layer 215 is disposed in the upper substrate 200, which does not include an electrode, such as a common electrode or a pixel electrode, for example, disposed therein. In addition, during a manufacturing process, the HT-VA LCD, or portions thereof (such as the upper substrate 200, with or without the lower substrate 100 and/or the liquid crystal layer 3 disposed therebetween, for example) may be transferred using ESC mode chucking, since the patterned conductive layer 215 is conductive.

An overcoat 250 is disposed on the color filters 230 and the light blocking member 220. The overcoat 250 may be made of an organic insulator, for example. The overcoat 250 prevents the color filters 230 from being exposed and provides a flat surface. The overcoat 250 may be omitted in one or more additional exemplary embodiments.

A first alignment layer 11 and a second alignment layer 21 are disposed on inner surfaces of the first substrate 100 and the second substrate 200, respectively. In an exemplary embodiment, the first alignment layer 11 and the second alignment layer 21 may be vertical alignment VA layers.

Column spacers (not shown) maintain a predetermined gap between the first substrate 100 and the second substrate 200. The liquid crystal layer 3, interposed between the lower substrate 100 and the upper substrate 200, has a positive dielectric anisotropy. Liquid crystal molecules 31 of the liquid crystal layer 3 have their longitudinal axes aligned to be substantially vertical to, e.g., perpendicular to, surfaces of the lower substrate 100 and the upper substrate 200 when an electric field is not applied to the liquid crystal layer 3.

When data voltages Vd (FIG. 1), having different polarities, are applied to the first pixel electrode 191a and the second pixel electrode 191b, an electric field is generated substantially parallel to the surfaces of the first substrate 100 and the second substrate 200. The liquid crystal molecules 31 of the liquid crystal layer 3, which are initially aligned to be substantially vertical to the surfaces of the first substrate 100 and the second substrate 200, are re-aligned according to the electric field and, accordingly, the long axes of at least some of the liquid crystal molecules 31 are aligned to be substantially parallel to the electric field, as shown in FIG. 7A, for example. A variation in degree of polarization of light incident to the liquid crystal layer 3 is changed depending on an inclination degree of the liquid crystal molecules 31. Specifically, the variation of the polarization is represented by a variation of transmittance through the polarizers, and the HT-VA LCD according to an exemplary embodiment thereby displays an image.

Thus, as described herein, one or more exemplary embodiments of the present invention provide benefits that include, but are not limited to, preventing the generation of static electricity in the HT-VA LCD without decreasing a transmittance of light therethrough, due to the electrically floated patterned conductive layer 215 disposed on portions of the second insulation substrate 210 and within the upper substrate 200, in which electrodes, such as common and/or pixel electrodes are not formed. Additionally, the HT-VA LCD according to an exemplary embodiment allows ESC mode chucking during a manufacturing process thereof and, therefore, substrates of the HT-VA CD can be transferred from one manufacturing process to another easily and without damaging the substrates or other portions of the HT-VA LCD.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A vertical alignment liquid crystal display comprising:
a first substrate;
a second substrate disposed opposite the first substrate; and
a liquid crystal layer disposed between the first substrate and the second substrate, wherein
the first substrate comprises:
a first insulation substrate;
a gate insulating layer disposed on the first insulating substrate;
a first semiconductor disposed on the gate insulating layer;
a first data line disposed on the first semiconductor;
a second semiconductor disposed on the gate insulating layer;
a second data line disposed on the second semiconductor;
a passivation layer disposed on the first data line and the second data line;
a first pixel electrode disposed on the passivation layer;
a second pixel electrode disposed on the passivation layer; and
a first alignment layer disposed on the first pixel electrode and the second pixel electrode,
the second substrate comprises:
a second insulation substrate;
a patterned conductive layer disposed on only a portion of the second insulation substrate which is above the first data line and the second data line; and
a second alignment layer disposed on the patterned conductive layer,
the liquid crystal layer includes vertically aligned liquid crystal molecules,
the first pixel electrode and the second pixel electrode are disposed in a same layer on the first insulation substrate, and
the first pixel electrode and the second pixel electrode each comprise:
a projection portion;
a longitudinal stem portion;
a transverse stem portion; and
branch portions extending from the longitudinal stem and the transverse stem, the branch portions forming about a 45 degree angle with both the longitudinal stem and the transverse stem.

2. The vertical alignment liquid crystal display of claim 1, further comprising:
a first storage electrode disposed on the first insulation substrate under the gate insulation layer; and
a second storage electrode disposed on the first insulation substrate under the gate insulation layer.

3. The vertical alignment liquid crystal display of claim 2, wherein
the first pixel electrode is disposed on the passivation layer above a portion of the first storage electrode, and
the second pixel electrode is disposed on the passivation layer above a portion of the second storage electrode.

4. The vertical alignment liquid crystal display of claim 2, further comprising:
a first ohmic contact disposed on the first semiconductor; and
a second ohmic contact disposed on the second semiconductor, wherein
the first storage electrode is disposed on the first ohmic contact, and
the second storage electrode is disposed on the second ohmic contact.

5. The vertical alignment liquid crystal display of claim 2, further comprising a storage extension part connected to the first storage electrode and the second storage electrode and disposed on the first substrate under the projection portions of the first pixel electrode and the second pixel electrode.

6. The vertical alignment liquid crystal display of claim 5, further comprising:
   a first drain electrode extension disposed on the gate insulating layer between the projection portion of the first pixel electrode and the storage extension part; and
   a second drain electrode extension disposed on the gate insulating layer between the projection portion of the second pixel electrode and the storage extension part, wherein
   an area of each of the first drain electrode extension and the second drain electrode extension is greater than an area of each of a first drain electrode and a second drain electrode, respectively.

7. The vertical alignment liquid crystal display of claim 1, further comprising:
   a light blocking member disposed on the patterned conductive layer.

8. The vertical alignment liquid crystal display of claim 7, wherein
   the light blocking member overlaps a portion of the first data line and the second data line.

9. The vertical alignment liquid crystal display of claim 7, wherein at least the light blocking member includes a dual-layer structure.

10. The vertical alignment liquid crystal display of claim 1, further comprising:
    a color filter disposed on a portion of a light blocking member.

11. The vertical alignment liquid crystal display of claim 10, further comprising an overcoat disposed on the color filter.

12. The vertical alignment liquid crystal display of claim 1, wherein
    the branch portions of the first pixel electrode are interdigitated with the branch portions of the second pixel electrode.

13. The vertical alignment liquid crystal display of claim 12, wherein,
    upper branch portions of the branch portions of both the first pixel electrode and the second pixel electrode are parallel to each other,
    lower branch portions of the branch portions of both the first pixel electrode and the second pixel electrode are parallel to each other, and
    the upper branch portions form about a 90 degree angle with the lower branch portions.

14. The vertical alignment liquid crystal display of claim 1, wherein at least one of the patterned conductive layer is electrically floated.

15. A method of manufacturing a vertical alignment liquid crystal display, the method comprising:
    forming a first substrate;
    forming a second substrate opposite to the first substrate;
    interposing a liquid crystal layer between the first substrate and the second substrate;
    forming a first insulation substrate on the first substrate;
    forming a gate insulating layer on the first insulating substrate;
    forming a first semiconductor and a second semiconductor on the gate insulating layer;
    forming a first data line on the first semiconductor;
    forming a second data line on the second semiconductor;
    forming a passivation layer on the first data line and the second data line;
    forming a first pixel electrode and a second pixel electrode on the passivation layer;
    forming a first alignment layer on the first pixel electrode and the second pixel electrode;
    forming a second insulation substrate on the second substrate;
    forming a first patterned conductive layer on only a portion of the second insulation substrate which is above the first pixel electrode and the first data line;
    forming a second patterned conductive layer on only a portion of the second insulation substrate which is above the second pixel electrode and the second data line;
    forming a second alignment layer on the first patterned conductive layer and the second patterned conductive layer, wherein
    the liquid crystal layer includes vertically aligned liquid crystal molecules,
    the first pixel electrode and the second pixel electrode are disposed in a same layer on the first insulation substrate, and
    the first pixel electrode and the second pixel electrode each comprise:
    a projection portion;
    a longitudinal stem portion;
    a transverse stem portion; and
    branch portions extending from the longitudinal stem and the transverse stem, the branch portions forming about a 45 degree angle with both the longitudinal stem and the transverse stem, wherein the branch portions of the first pixel electrode are interdigitated with the branch portions of the second pixel electrode.

16. The method of claim 15, further comprising:
    forming a first storage electrode on the first insulation substrate under the gate insulation layer;
    forming a second storage electrode on the first insulation substrate under the gate insulation layer;
    forming a first ohmic contact on the first semiconductor; and
    forming a second ohmic contact on the second semiconductor, wherein
    the first storage electrode is disposed on the first ohmic contact, and
    the second storage electrode is disposed on the second ohmic contact,
    the first pixel electrode is disposed on the passivation layer above a portion of the first storage electrode, and
    the second pixel electrode is disposed on the passivation layer above a portion of the second storage electrode.

17. The method of claim 16, further comprising:
    forming a storage extension part connected to the first storage electrode and the second storage electrode and disposed on the first substrate under the projection portions of the first pixel electrode and the second pixel electrode;
    forming a first drain electrode extension on the gate insulating layer between the projection portion of the first pixel electrode and the storage extension part; and
    forming a second drain electrode extension on the gate insulating layer between the projection portion of the second pixel electrode and the storage extension part, wherein
    an area of each of the first drain electrode extension and the second drain electrode extension is greater than an area of each of a first drain electrode and a second drain electrode, respectively.

18. The method of claim 15, further comprising:
forming a first light blocking member on the first patterned conductive layer; and
forming a second light blocking member on the second patterned conductive layer, wherein
the first light blocking member overlaps the first data line and a portion of the first pixel electrode,
the second light blocking member overlaps the second data line and a portion of the second pixel electrode, and
at least one of the first light blocking member and the second light blocking member includes a dual-layer structure.

19. The method of claim 15, further comprising:
forming a first color filter on a first portion of a first light blocking member;
forming a second color filter on a second portion of a second light blocking member; and
forming an overcoat on the first color filter and the second color filter.

20. The method of claim 15, wherein
upper branch portions of the branch portions of both the first pixel electrode and the second pixel electrode are parallel to each other,
lower branch portions of the branch portions of both the first pixel electrode and the second pixel electrode are parallel to each other, and
the upper branch portions form about a 90 degree angle with the lower branch portions.

21. The method of claim 15, wherein at least one of the first patterned conductive layer and the second patterned conductive layer is electrically floated.

* * * * *